United States Patent
Shimoda et al.

Patent Number: 5,753,188
Date of Patent: May 19, 1998

[54] APPARATUS FOR PURIFYING THE EXHAUST GAS OF DIESEL ENGINES

[75] Inventors: Masatoshi Shimoda; Mitsuru Hosoya, both of Tokyo, Japan

[73] Assignee: Hino Motors, Ltd., Tokyo, Japan

[21] Appl. No.: 680,226

[22] Filed: Jul. 11, 1996

[30] Foreign Application Priority Data

Jul. 13, 1995 [JP] Japan ................... 7-177132

[51] Int. Cl.⁶ .................. G05D 9/00; B01D 50/00; F01N 3/00
[52] U.S. Cl. .................. 422/108; 422/180; 422/181; 60/277; 60/286; 60/290; 60/303; 60/320
[58] Field of Search .................. 60/274, 277, 278, 60/285, 286, 287, 288, 290, 299, 320, 303; 422/108, 177, 180, 181

[56] References Cited

U.S. PATENT DOCUMENTS

| | | | |
|---|---|---|---|
| 5,155,994 | 10/1992 | Muraki et al. | 60/275 |
| 5,209,062 | 5/1993 | Vollenweider | 60/280 |
| 5,255,511 | 10/1993 | Maus et al. | 60/274 |
| 5,343,700 | 9/1994 | Fujimoto et al. | 20/276 |
| 5,355,671 | 10/1994 | Maus et al. | 60/274 |
| 5,357,751 | 10/1994 | Orzel | 60/274 |

*Primary Examiner*—Nina Bhat
*Attorney, Agent, or Firm*—McCormick, Paulding & Huber

[57] ABSTRACT

An apparatus is disclosed for purifying the exhaust gas of a diesel engine by reducing the contents of soluble organic fractions which are particulates. The apparatus comprises a catalyzer provided on an exhaust pipe, a cooler provided around either a portion of the pipe between the catalyzer and the engine or the catalyzer in itself for cooling the gas flowing through the pipe, a temperature sensor for detecting the temperature of the gas flowing through the pipe, a tachometer for detecting the rotating speed of the engine, a load sensor for detecting the load on the engine, a controller for controlling the cooler on the basis of the respective detection outputs from the sensors.

9 Claims, 7 Drawing Sheets

APPARATUS FOR PURIFYING THE EXHAUST GAS OF DIESEL ENGINES

BACKGROUND OF THE INVENTION

This invention relates to an apparatus for purifying the exhaust gas of a diesel engine by reducing the contents of soluble organic fractions (SOF) which are particulates resulting from incomplete combustion of fuels or lube oils, as well as nitrogen oxides (NOx) in the exhaust gas.

One of the conventional apparatus that are intended specifically to reduce the content of SOF in the diesel-engine exhaust gas is a catalyst converter that is fitted on the exhaust pipe and which is loaded with an oxidation catalyst. The catalyst comprises a honeycomb-shaped or pelletized porous ceramic (e.g., alumina) support that carries a noble metal (e.g., Pt or Pd) dispersed therein. The operating principle of this apparatus is such that the catalyst oxidizes the SOF in the exhaust gas to carbon dioxide and water, which are discharged into the air atmosphere.

One of the conventional apparatus that are specifically intended to reduce the content of NOx in the diesel-engine exhaust gas is a monolithic catalyst comprising a copper ion-exchanged zeolite. The copper ion-exchanged zeolite is prepared by replacing the Na ions on a N-form zeolite ZSM-5 with the Cu ion. A copper ion-exchanged zeolite catalyst is fabricated by first forming a honeycomb-shaped monolithic support of a ceramic material such as cordierite and then coating a surface of the support with the copper ion-exchanged zeolite ZSM-5. In the presence of both oxygen and hydrocarbons on this catalyst, the selective reduction of NOx will proceed in an efficient catalyst manner over a predominant exhaust gas temperature range of 350°–500° C., thereby enabling the purification of the exhaust from diesel engines, lean-burn gasoline engines, etc.

The major drawback of the apparatus for reducing the SOF content is that if the exhaust gas temperature exceeds 400° C., $SO_2$ in the exhaust gas is oxidized with the oxidation catalyst to cause an abrupt increase in the formation of sulfate mists which fall in the category of particulates. As a result, the particulate emissions into the air atmosphere will increase.

The copper ion-exchanged zeolite catalyst used as an apparatus for reducing the NOx features high capability of selective reduction of NOx but the performance will deteriorate if the exhaust gas temperature is outside the range of 350°–500° C.

The above-described exhaust gas purifiers have had their own problems.

SUMMARY OF THE INVENTION

The present invention has been accomplished under these circumstances and has as an object providing an apparatus for purifying the exhaust gas of a diesel engine that is capable of reducing the particulate emissions into the atmosphere by effectively controlling the generation of sulfate mists under all operating conditions of the engine.

Another object of the invention is to provide a diesel-engine exhaust gas purifier that is capable of more efficient reduction of NOx than the existing apparatus.

According to the present invention, there is provided an apparatus for purifying the exhaust gas from a diesel engine which comprises: a catalyzer provided on an exhaust pipe from the diesel engine; a cooler provided around either a portion of said exhaust pipe between said catalyzer and said diesel engine or said catalyzer itself for cooling the exhaust gas flowing through said exhaust pipe; a temperature sensor for detecting the temperature of the exhaust gas flowing through said exhaust pipe; a tachometer for detecting the rotating speed of said engine; a load sensor for detecting the load on said engine; and a controller for controlling said cooler on the basis of the respective detection outputs from said temperature sensor, said tachometer and said load sensor.

THE PREFERRED EMBODIMENTS OF THE INVENTION

Figure 1:
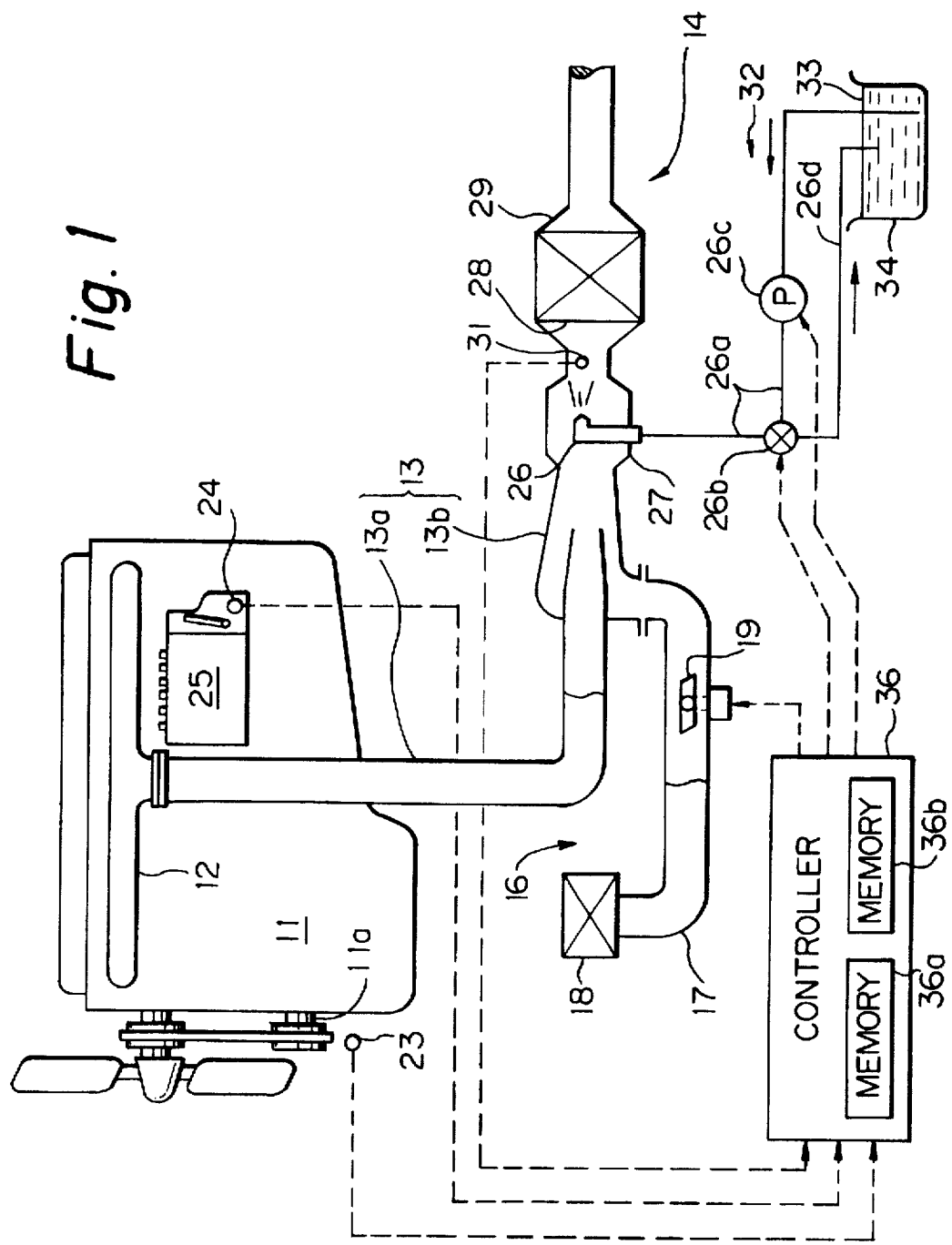
FIG. 1 is a schematic representation of a diesel-engine exhaust gas purifier according to a first embodiment of the invention.

The structural features of the present invention for attaining the above-stated objects are described with specific reference to FIGS. 1 and 4–7 which represent the first and fourth to seventh embodiments of the invention.

The apparatus of the invention for purifying the exhaust gas of a diesel engine comprises: a catalyzer 14 (or 50) provided on an exhaust pipe 13 from the diesel engine 11; a cooler 16 (or 70 or 90) provided around either a portion of the exhaust pipe 13 between the catalyzer 14 (or 50) and the diesel engine 11 or the catalyzer 14 (or 50) itself for cooling the exhaust gas flowing through the exhaust pipe 13; a temperature sensor 31 for detecting the temperature of the exhaust gas flowing through the exhaust pipe 13; a tachometer 23 for detecting the rotating speed of the engine 11; a load sensor 24 for detecting the load on the engine 11; and a controller 36 (or 53, 74 or 84) for controlling the cooler 16 (or 70 or 90) on the basis of the respective detection outputs from the temperature sensor 31, tachometer 23 and load sensor 24.

The catalyzer 50 according to one embodiment comprises a catalyst converter 52 accommodating an oxidation catalyst 51. The catalyzer 14 according to another embodiment comprises a NOx catalyst 28, an injection nozzle 26 provided at the inlet of NOx catalyst 28 for ejecting a liquid hydrocarbon 33 onto the NOx catalyst; a liquid hydrocarbon supply member for feeding the liquid hydrocarbon 33 to the injection nozzle 26 via a regulating valve 26b, and a controller 36 for controlling the regulating valve 26b on the basis of the respective detection outputs from the temperature sensor 31, tachometer 23 and load sensor 24.

The cooler 16 comprises an air feed pipe 17 connected to the exhaust pipe 13 at a site upstream of the catalyzer 14 (or 50) in the exhaust line for introducing air into the exhaust pipe 13 and an opening adjust valve 19 provided on the air feed pipe 17 for adjusting its opening. The temperature sensor 31 is inserted into that portion of the exhaust pipe 13 which is located between the catalyzer 14 (or 50) and the air feed pipe 17, and controller 36 (or 53) is adapted to control the opening adjust valve 19 on the basis of the respective detection outputs from the temperature sensor 31, tachometer 23 and load sensor 24. If desired, there may be provided a turbocharger 41 that is driven by the energy of the exhaust gas from the diesel engine 11, with a branch pipe 48 being connected to an air intake pipe 46 extending downstream of the compressor in turbocharger 41, the air feed pipe 17 in turn being connected to the branch pipe 48.

A cooler 70 in another embodiment comprises a heat exchanger 71 provided on the exhaust pipe 13 at a site upstream of the catalyzer 14 (or 50) in the exhaust line, and a coolant supply member which supplies a coolant to the heat exchanger 71 for lowering the exhaust gas temperature and which is so adapted that it is controlled by controller 74.

A cooler 90 in yet another embodiment comprises a heat exchanger 91 provided around the catalyzer 14 (or 50) and a coolant supply member which supplies the heat exchanger 91 with a coolant that flows through the catalyzer 14 (or 50) to lower the temperature of the exhaust gas. The coolant supply means is so adapted that it is controlled by a controller 74 (or 84). Preferably, the coolant is air and the coolant supply member is a blower 72 that is capable of adjusting the air flow into the heat exchanger 91.

The apparatus of the invention operates in the following manner. When temperature sensor 31 detects the fact that the temperature of the exhaust gas from the diesel engine 11 has exceeded a threshold, controller 36 (or 53, 74 or 84) renders a cooler 16 (or 70 or 90) operative on the basis of the detection outputs from the temperature sensor 31, tachometer 23 and load sensor 24, whereupon the cooler cools the exhaust gas in the exhaust pipe 13 to a specified temperature at which the catalyzer 14 (or 50) being supplied with the exhaust gas will attain the best result.

The first embodiment of the invention will now be described in detail with particular reference to FIG. 1. As shown, a diesel engine 11 has an exhaust manifold 12 which is connected to an exhaust pipe 13. The exhaust pipe 13 consists of an upstream portion 13a one end of which is connected to the exhaust manifold 12 and a downstream portion 13b one end of which is connected to the other end of upstream portion 13a and the other end of which is open to the air atmosphere. One end of the downstream exhaust pipe 13b is formed in a larger diameter than the other end of the upstream exhaust pipe 13a such that the other end of the latter is inserted into one end of the downstream exhaust pipe 13b toward the other end thereof. One end of the downstream exhaust pipe 13b is formed as a tapered pipe that decreases in diameter toward the other end. The other end of the upstream exhaust pipe 13a is also formed as a tapered pipe that decreases in diameter toward the other end of the downstream exhaust pipe 13b. The downstream exhaust pipe 13b is fitted with a catalyzer 14 provided halfway its path.

One end of the downstream exhaust pipe 13b is such that its underside has connected thereto one end of an air feed pipe 17 on a cooler 16 through which air is introduced into the downstream exhaust pipe 13b. The other end of the air feed pipe 17 is open to the air atmosphere and fitted with an air cleaner 18 for rejecting any dirt and dust contained in the air. Provided halfway the path of the air feed pipe 17 is an opening adjust valve 19 for adjusting the opening of that pipe. The crankshaft 11a of the engine 11 is fitted with a tachometer 23 for detecting the rotating speed of the crankshaft 11a, and an injection pump 25 for injecting a fuel into the engine 11 is fitted with a rack or load sensor 24 for detecting the load on the engine 11.

The catalyzer 14 has an injection nozzle 26 and a NOx catalyst 28. Provided halfway the path of the downstream exhaust pipe 13b are a reductant injection compartment 27 containing the injection nozzle 26 and a NOx catalyst compartment 29 accommodating the NOx catalyst 28, which are arranged in that order from the engine side. An injection nozzle 26 is directed toward the NOx catalyst 28. A temperature sensor 31 for detecting the temperature of the exhaust gas flowing into the NOx catalyst 28 is provided between that catalyst and the injection nozzle 26. In the case under consideration, the NOx catalyst 28 is composed of a copper ion-exchanged zeolite (Cu-ZSM-5), which is prepared by replacing the sodium ions in zeolite ZSM-5 with the copper ion and capable of reducing NOx at temperatures in the range from about 350° to about 500° C.

The injection nozzle 26 is supplied with a hydrocarbon-based reductant 33 from a reductant supply member 32. Stated more specifically, the injection nozzle 26 is connected to a fluid conduit 26a which, in turn, is connected to a reductant storage tank 34 via a three-way valve 26b and a pressure pump 26c. In the case under consideration, the hydrocarbon-based reductant 33 is diesel fuel. The three-way valve 26b is also connected to a return pipe 26d extending to the tank 34. The three-way valve 26b allows the reductant 33 to be supplied to the injection nozzle 26 in an operative mode but causes the supplied reductant 33 to flow back through the return pipe 26d in an inoperative mode.

The three-way valve 26b and pressure pump 26c are connected to the control output of the controller 36. The control input of the controller 36 is connected to the respective detection outputs from the temperature sensor 31, tachometer 23 and rack sensor 24, and the control output of the controller 36 is also connected to the opening adjust valve 19. The controller 36 has two memories 36a and 36b. The memory 36a stores in a map format the values of the quantity of the hydrocarbon-based reductant 33 to be ejected from the nozzle 26 on to the NOx catalyst 28 which is variable with the rotating speed of the diesel engine 11, the load on it, and the temperature of the exhaust gas. The other memory 36b stores in a map format the values of an optimal opening of the valve 19 which is variable with the exhaust gas temperature, the rotating speed of the crankshaft 11a and the load on the engine 1. Thus, by supplying the downstream exhaust pipe 13b with a specified air flow as determined on the basis of the map , the exhaust gas flowing into the catalyzer 14 will be cooled to an optimal temperature in the range of 350°–500° C.

The thus constructed diesel-engine exhaust gas purifier will operate in the following manner.

First, either one or more of the tachometer 23, rack sensor 24 and temperature sensor 31 check the operating state of the diesel engine 11 and determine whether it is idling or in a cold state where the exhaust temperature is no more than about 300° C., typically at start-up. In this case, the controller 36 renders the pressure pump 26c and three-way valve 26b inoperative and does not allow the reductant 33 to be ejected from the injection nozzle 26.

As the diesel engine 11 continues to operate, the exhaust gas temperature will exceed 350° C. If this is detected by the temperature sensor 31, the controller 36 renders the three-way valve 26b and pressure pump 26c operative and causes the hydrocarbon-based reductant 33 to be ejected from the injection nozzle 26. At the same time, the controller 36 compares the respective detection outputs of temperature sensor 31, tachometer 23 and rack sensor 24 with the values stored in a mat format in the memory 36b, thereby determining an optimal degree of opening of the valve 19 and performs the necessary control to ensure that the valve opens to the thus determined degree. The exhaust gas stream that is ejected from the other end of the upstream exhaust pipe 13a into one end of the downstream exhaust pipe 13b creates a negative pressure within the air feed pipe 17, which produces an air stream that flows from the other end of the air feed pipe 17 toward one end thereof, thus flowing into the downstream exhaust pipe 13b. As a result, the exhaust gas mixes with the air stream and cools down to 500° C. or below. If the exhaust gas temperature as detected by the temperature sensor 31 is optimal ($\leq 500°$ C.), the controller 36 closes the opening adjust valve 19 such that the exhaust gas temperature at the inlet of the NOx catalyst 28 is held within the range 350°–500° C. The presence of the reductant in the NOx catalyst 28 accelerates the reduction of NOx in the exhaust gas such that it is efficiently converted to $N_2$.

Figure 2:
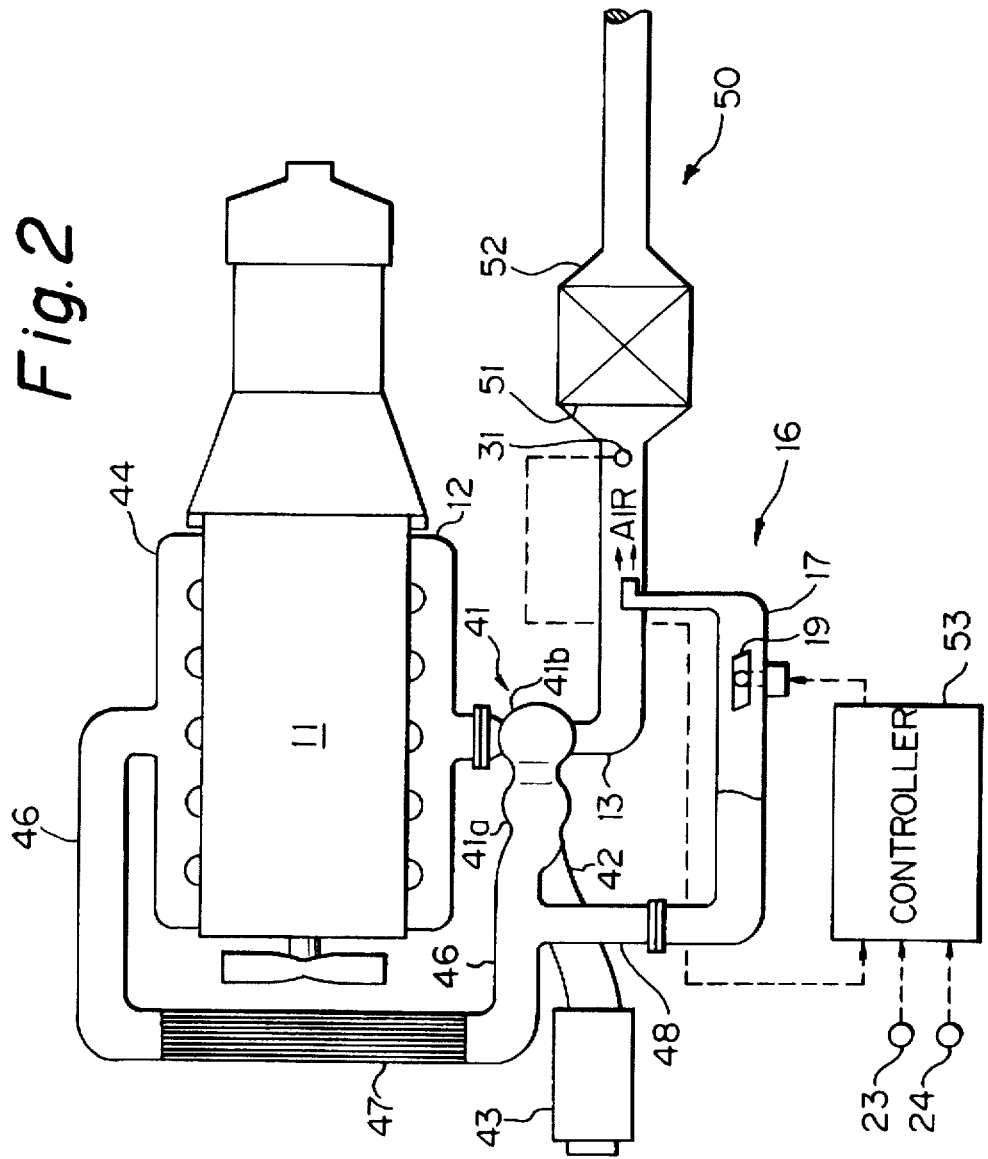
FIG. 2 is a schematic representation of a diesel-engine exhaust gas purifier according to a second embodiment of the invention.

FIG. 2 shows the second embodiment of the invention, in which the parts or components that are the same as those shown in FIG. 1 are identified by like numerals.

As shown, the diesel engine 11 has a turbocharger 41, with an exhaust pipe 13 being connected to the exhaust manifold 12. The exhaust turbine 41b of the turbocharger 41 is provided halfway the path of the exhaust pipe 13. The intake compressor 41a of the turbocharger 41 has an air cleaner 43 connected to the air inlet via an air pipe 42. The intake compressor 41a is connected to the intake manifold 44 of the engine 11 by means of an intake pipe 46, which has an intercooler 47 provided halfway its path for cooling the compressed air discharged from the compressor 41a. Although not shown, a radiator is provided between the front portion of the engine 11 and the intercooler 47. A branch pipe 48 branches from the intake pipe 46 between the intake compressor 41a and the intercooler 47 and extends to be connected to the other end of an air feed pipe 17 which serves as the cooler 16.

In the case shown, one distal end of the air feed pipe 17 is bent substantially at right angles such that the air ejected from that distal end is directed toward a catalyzer 50 provided downstream the exhaust pipe 13. The catalyzer 50 is a catalyst converter 52 accommodating an oxidation catalyst 51. In the case under consideration, the oxidation catalyst 51 is prepared by dispersing Pt or Pd in a honeycomb-shaped or pelletized porous alumina support (not shown). The temperature sensor 31 is inserted into the exhaust pipe 13 between the converter 52 and the junction with the air feed pipe 17 at a site closer to the converter 52.

The detection outputs of the temperature sensor 31, tachometer 23 and rack sensor 24 are connected to the control input of a controller 53, and its control output is connected to an opening adjust valve 19. The controller 53 has a memory (not shown) that stores in a map format the values of an optimal opening of the valve 19 that varies with the exhaust gas temperature, the rotating speed of the crankshaft and the load on the engine 11. Thus, by supplying the exhaust pipe 13 with a specified air flow as determined on the basis of the map, the exhaust gas flowing into the converter 52 will be cooled to an optimal temperature not higher than 400° C.

The thus constructed exhaust gas purifier operates as follows. If the temperature sensor 31 detects an exhaust gas temperature exceeding 400° C., the controller 53 compares the detection outputs of temperature sensor 31, tachometer 23 and rack sensor 24 with the values stored in a mat format in the memory, thereby determining an optimal degree of opening of the valve 19 and performs the necessary control to ensure that the valve opens to the thus determined degree. As a result, the intake compressor 41a of the turbocharger 41 compresses the fresh air that has been supplied from air cleaner 43 via air pipe 42 and discharges the compressed air into the intake pipe 46 and the branch pipe 48 as well. The air discharged into the branch pipe 48 is ejected at high speed from the air feed pipe 17 to flow into the exhaust pipe 13, where the air mixes with the exhaust gas to lower its temperature. As a result, the cooler 16 ensures that the temperature of the exhaust gas is always held at 400° C. and below irrespective of the operating conditions of the engine 11.

Figure 3:
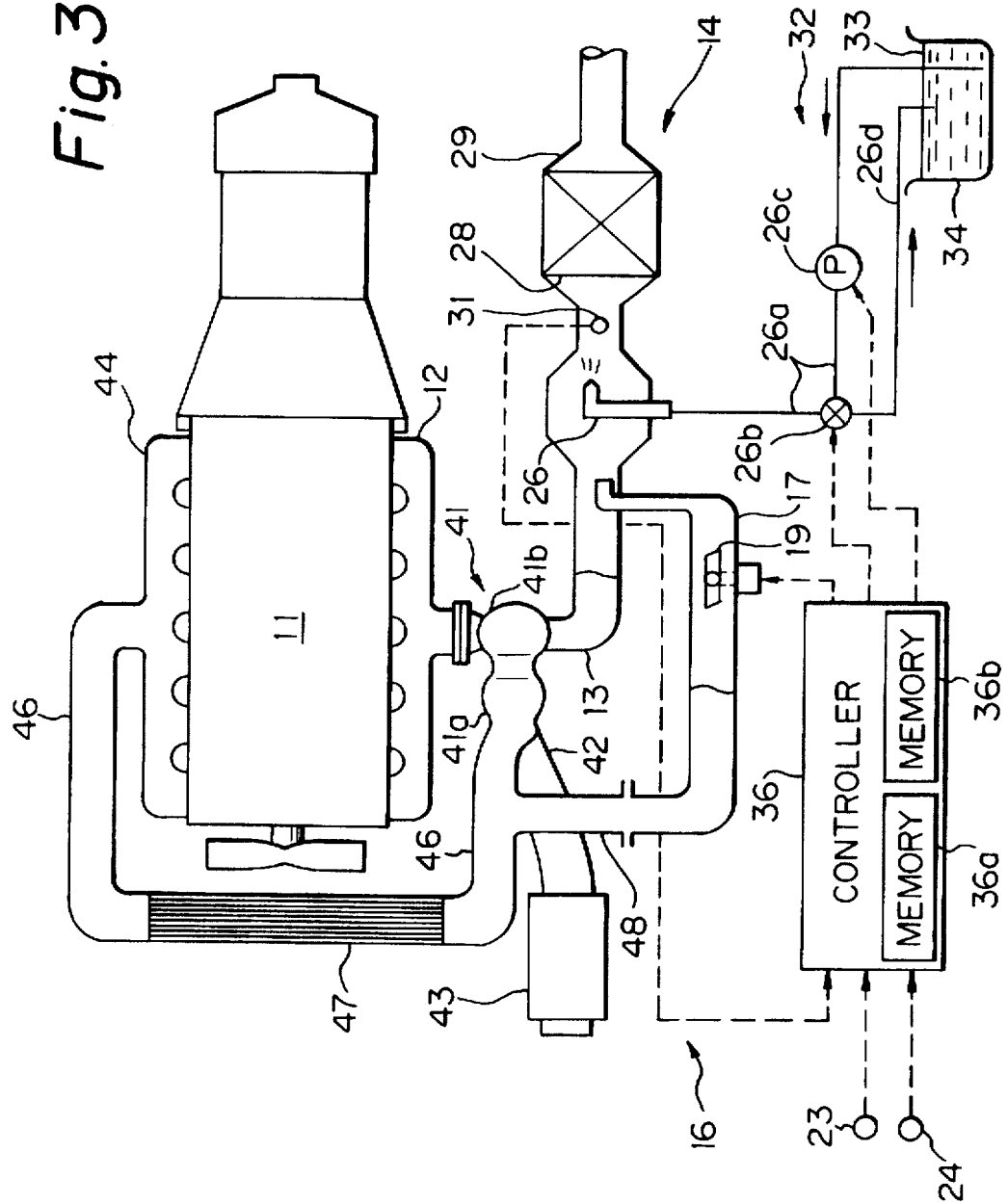
FIG. 3 is a schematic representation of a diesel-engine exhaust gas purifier according to a third embodiment of the invention.

FIG. 3 shows the third embodiment of the invention, in which the parts or components that are the same as those shown in FIGS. 1 and 2 are identified by like numerals.

In the case shown, the catalyzer 14 described in connection with the first embodiment is provided halfway the path of the exhaust pipe 13 from the diesel engine 11 and the cooler 16 is provided upstream of the catalyzer 14 such that the supercharged air from the turbocharger 41 described in connection with the second embodiment is injected into the exhaust pipe 13 via the air feed pipe 17.

In the thus constructed exhaust gas purifier, the cooler 16 ejects air from the air feed pipe 17 to flow into the exhaust pipe 13, where the injected air mixes with the exhaust gas to lower its temperature. The other aspects of the operation are identical to those of the first embodiment and will not be described to avoid redundancy.

Figure 4:
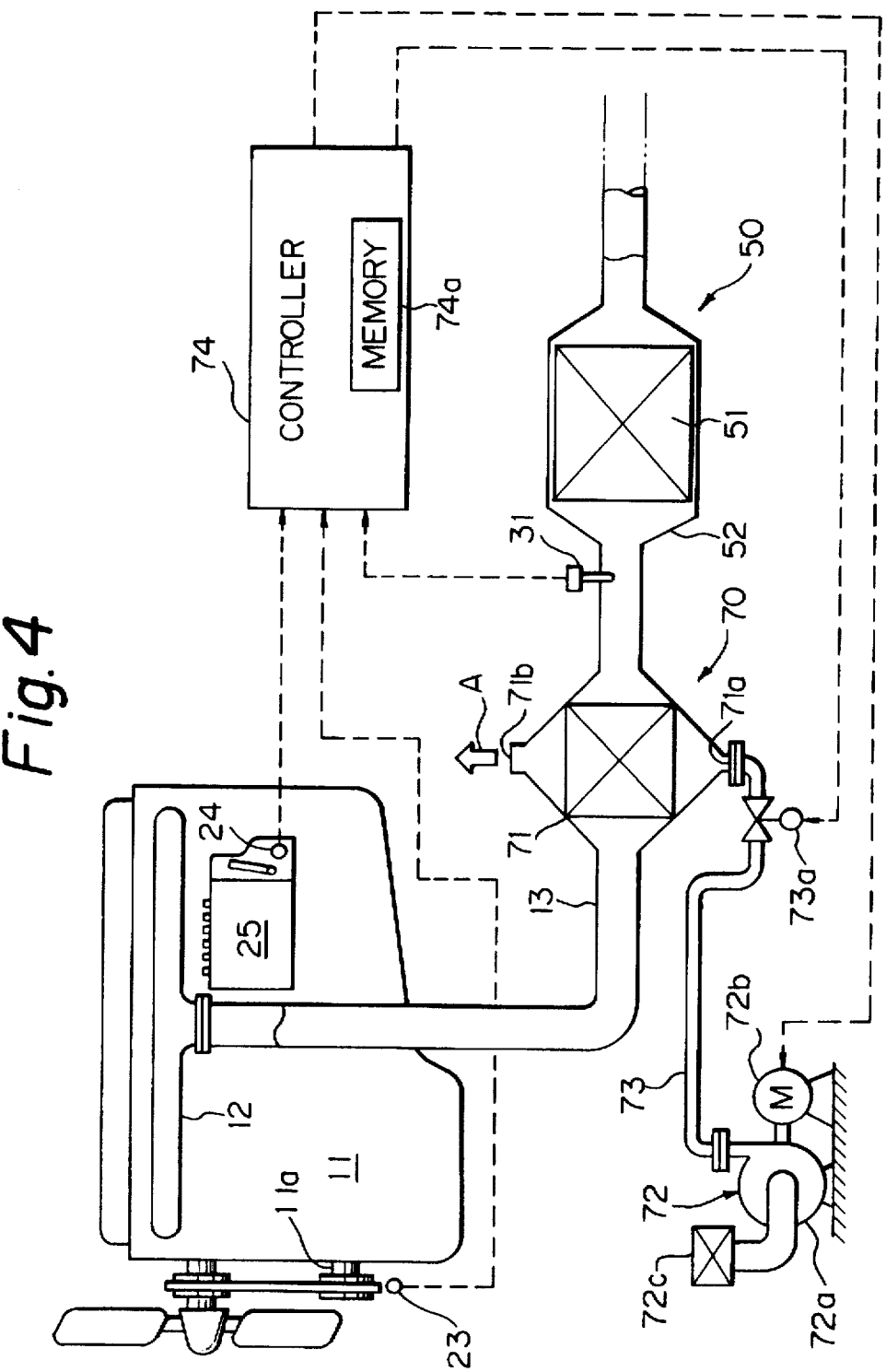
FIG. 4 is a schematic representation of a diesel-engine exhaust gas purifier according to a fourth embodiment of the invention.

FIG. 4 shows the fourth embodiment of the invention, in which the parts or components that are the same as those shown in FIGS. 1 and 2 are identified by like numerals.

In the case shown, the catalyzer 50 that was described in connection with the second embodiment and which accommodates the oxidation catalyst 51 is provided halfway the path of the exhaust pipe 13 from the diesel engine 11 and a heat exchanger 71 which serves as a cooler 70 is provided upstream of the catalyzer 50. Although not shown in detail, the heat exchanger 71 has essentially the same structure as a radiator for cooling the engine cooling water. The basic components of the heat exchanger 71 are a plurality of fins and a plurality of tubular members that penetrate the fins and which permit the passage of a coolant. The fins are made of a stainless steel and extend, parallel to one another, along the flow of the exhaust gas. The tubular members are also made of a stainless steel and extend through the fins. The coolant flows into the heat exchanger 71 via a coolant inlet 71a, passes through the tubular members to cool the fins and thereafter leaves the heat exchanger via a coolant outlet 71b as indicated by arrow A.

In the case under consideration, the coolant to flow through the heat exchanger 71 is air, which is supplied from a blower 72 (coolant supply means) to enter the heat exchanger via an air pipe 73. One end of the air pipe 73 is connected to the coolant inlet 71a of the heat exchanger 71 and the other end of the air pipe 73 is connected to the blower 72. The blower 72 comprises the main body 72a having rotary blades (not shown) and a motor 72b for driving these blades. An air cleaner 72c is provided at the intake port of the main body 72a. The motor 72b is adapted to be capable of changing the rotating speed of the blades either steplessly or in a series of steps, thereby controlling the flow of air from the blower 72 to the heat exchanger 71. A valve 73a capable of opening or closing the air pipe 73 is provided halfway its path.

The temperature sensor 31 is inserted into the exhaust pipe 13 in the same manner as in the second embodiment. The tachometer 23 for detecting the rotating speed of the crankshaft 11a and rack sensor 24 for detecting the load on the engine 11 are also provided and the detection outputs of these sensors, as well as the detection output of the temperature sensor 31 are connected to the control input of controller 74. The control output of the controller 74 is connected to the motor 72b and valve 73a. The controller 74 has a memory 74a which stores in a map format the values of an optimal rotating speed of the blades in the main body 72a of the blower 72 which varies with the exhaust gas temperature, the rotating speed of crankshaft 11a and the load on engine 11. Thus, by supplying the exhaust pipe 13 with a specified air flow as determined on the basis of the map, the exhaust gas is cooled with the heat exchanger 71 such that the temperature of the exhaust gas flowing into the catalyzer 50 will attain an optimal value not higher than 400° C.

The thus constructed exhaust gas purifier operates as follows. If the temperature sensor 31 detects an exhaust gas temperature exceeding 400° C., the controller 74 compares the detection outputs of respective sensors 31, 23 and 24 with the values stored in a map format in the memory 74a, thereby determining an optimal rotating speed of the blades in the main body 72a of the blower 72, opening the valve 73a and causing the blades in the main body 72a to rotate at the determined optimal speed, whereupon a specified volume of air is introduced into the tubular members of the heat exchanger 71. The thus introduced air will cool the fins in the heat exchanger 71. As a result, the exhaust gas hotter than 400° C. is cooled as it passes through the fins such that the temperature of the exhaust gas flowing into the oxidation catalyst 51 drops to 400° C. and below. The exhaust gas purifier according to the fourth embodiment is advantageous over the previous embodiments in that it does not increase the flow of the exhaust gas.

Figure 5:
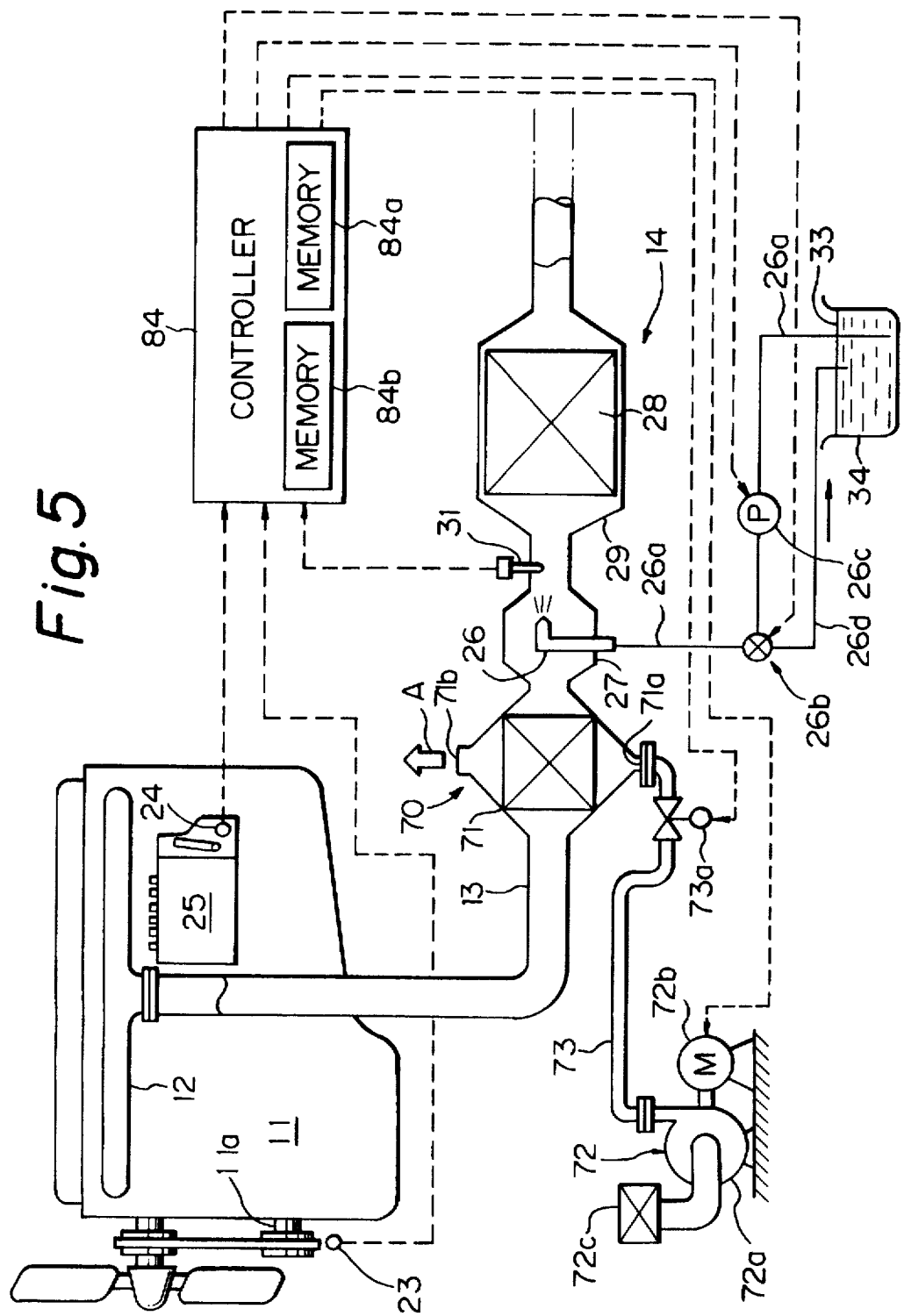
FIG. 5 is a schematic representation of a diesel-engine exhaust gas purifier according to a fifth embodiment of the invention.

FIG. 5 shows the fifth embodiment of the invention, in which the parts or components that are the same as those shown in FIGS. 1 and 4 are identified by like numerals.

In the case shown, the catalyzer 14 described in connection with the first embodiment is provided halfway the path of the exhaust pipe 13 from the diesel engine 11 and the heat exchanger 71 that was described in connection with the fourth embodiment and which serves as a cooler 70 is provided upstream of the catalyzer 14, with coolant air being supplied to the heat exchanger 71 by means of blower 72. The control output of the controller 84 is connected to motor 72b and air pipe open/close valve 73a, as well as to the three-way valve 26b and pressure pump 26c which are part of the catalyzer 14. The controller 84 has two memories 84a and 84b. The memory 84a stores in a map format the values of the quantity of a hydrocarbon-based reductant 33 to be ejected from the nozzles 26 onto the NOx catalyst 28 which is variable with the rotating speed of the diesel engine 11, the load on it and the exhaust temperature. The other memory 84b stores in a map format the values of an optimal rotating speed of the blades in the main body 72a of the blower 72 which is variable with the exhaust gas temperature, the rotating speed of the crankshaft 11a and the load on the engine 11.

The thus constructed exhaust gas purifier operates as follows. If the temperature sensor 31 detects an exhaust gas temperature exceeding 500° C., the controller 84 compares the detection outputs of the respective sensors 31, 23 and 24 with the values stored in a map format in the memory 84b, thereby determining an optimal rotating speed of the blades in the main body 72a of the blower 72, opening the valve 73a and causing the blades in the main body 72a to rotate at the determined optimal speed, whereupon a specified volume of air is introduced into the heat exchanger 71. The other aspects of the operation are identical to those of the first and fourth embodiments and will not be described to avoid redundancy.

Figure 6:
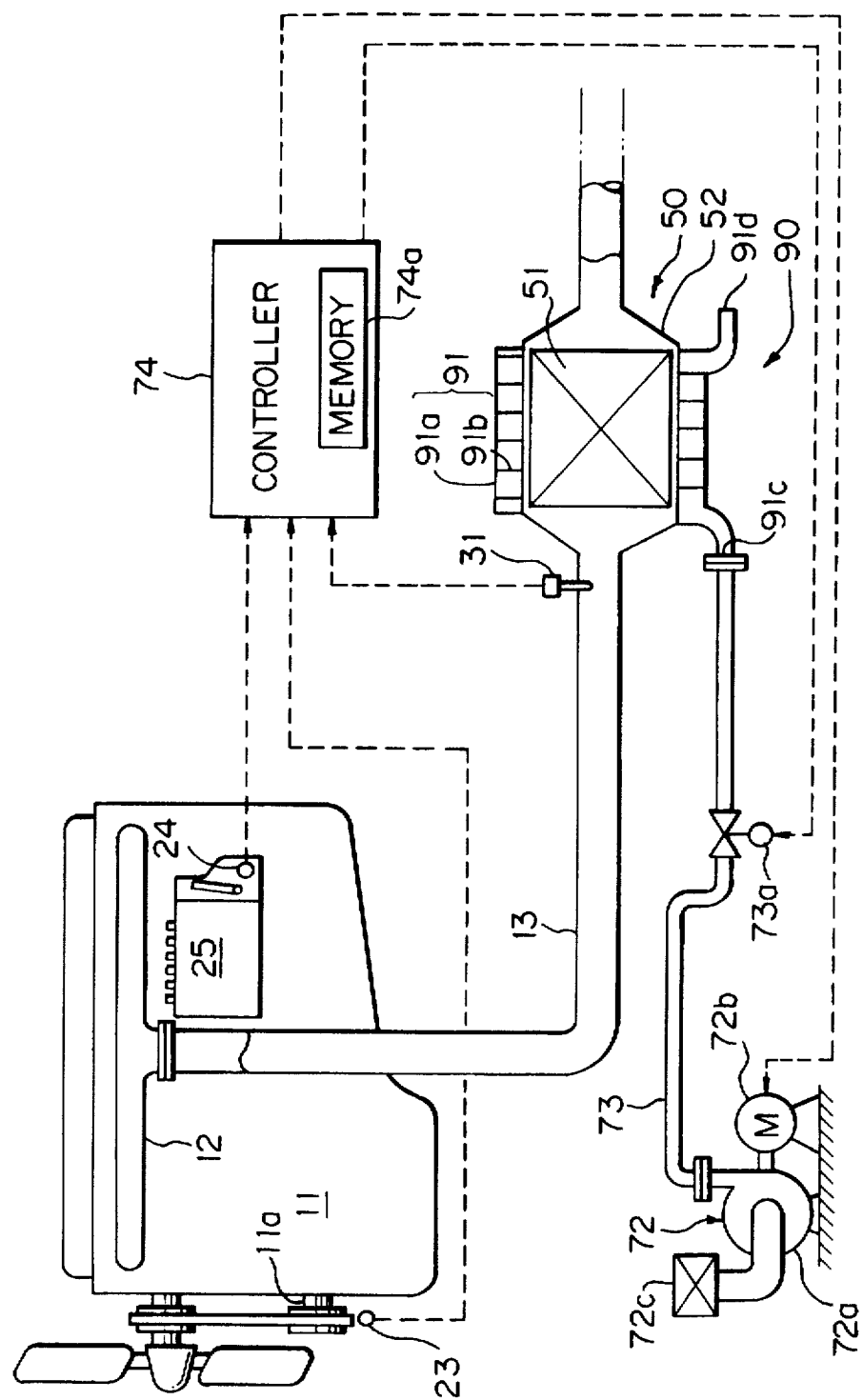
FIG. 6 is a schematic representation of a diesel-engine exhaust gas purifier according to a sixth embodiment of the invention.

FIG. 6 shows the sixth embodiment of the invention, in which the parts or components that are the same as those in FIGS. 2 and 4 are identified by like numerals.

In the case shown, the catalyzer 50 that was described in connection with the second embodiment and which comprises the catalyst converter 52 accommodating the oxidation catalyst 51 is provided halfway the path of the exhaust pipe 13 from the diesel engine 11, and a cooler 90 in the form of a heat exchanger 91 is provided around the catalyst converter 52. The heat exchanger 91 comprises a tubular portion 91a that is spaced from the outer circumference of the catalyst converter 52 to be covered with said tubular portion and guide plates 91b that are provided within the tubular portion for guiding a coolant to flow spirally along the outer circumference of the catalyst converter 52. The coolant is admitted into the tubular portion 91a via an inlet 91c, flows spirally along the outer circumference of the catalyst converter 52 and is then discharged through an outlet 91d. In the case under consideration, the coolant to flow through the heat exchanger 91 is air, which is supplied from the blower 72 (a coolant supply member as described in connection with the fourth embodiment) via the air pipe 73. The blower 72 is controlled by the controller 74.

The thus constructed exhaust gas purifier operates as follows. If the temperature sensor 31 detects an exhaust gas temperature exceeding 400° C., the controller 74 compares the detection outputs of respective sensors 31, 23 and 24 with the values stored in a map format in the memory 74a, thereby determining an optimal rotating speed of the blades in the main body 72a of the blower 72, opening the air pipe open/close valve 73a and causing the blades in the main body 72a to rotate at the determined optimal speed, whereupon a specified volume of air is introduced into the tubular portion 91a of the heat exchanger 91. The thus introduced air is caused to flow spirally by means of guide plates 91b in the heat exchanger 91 such as to cool the outer circumference of the catalyst converter 52. As a result, the oxidation catalyst 51 is cooled such that the exhaust gas hotter than 400° C. gets cooler upon contact with the catalyst.

Figure 7:
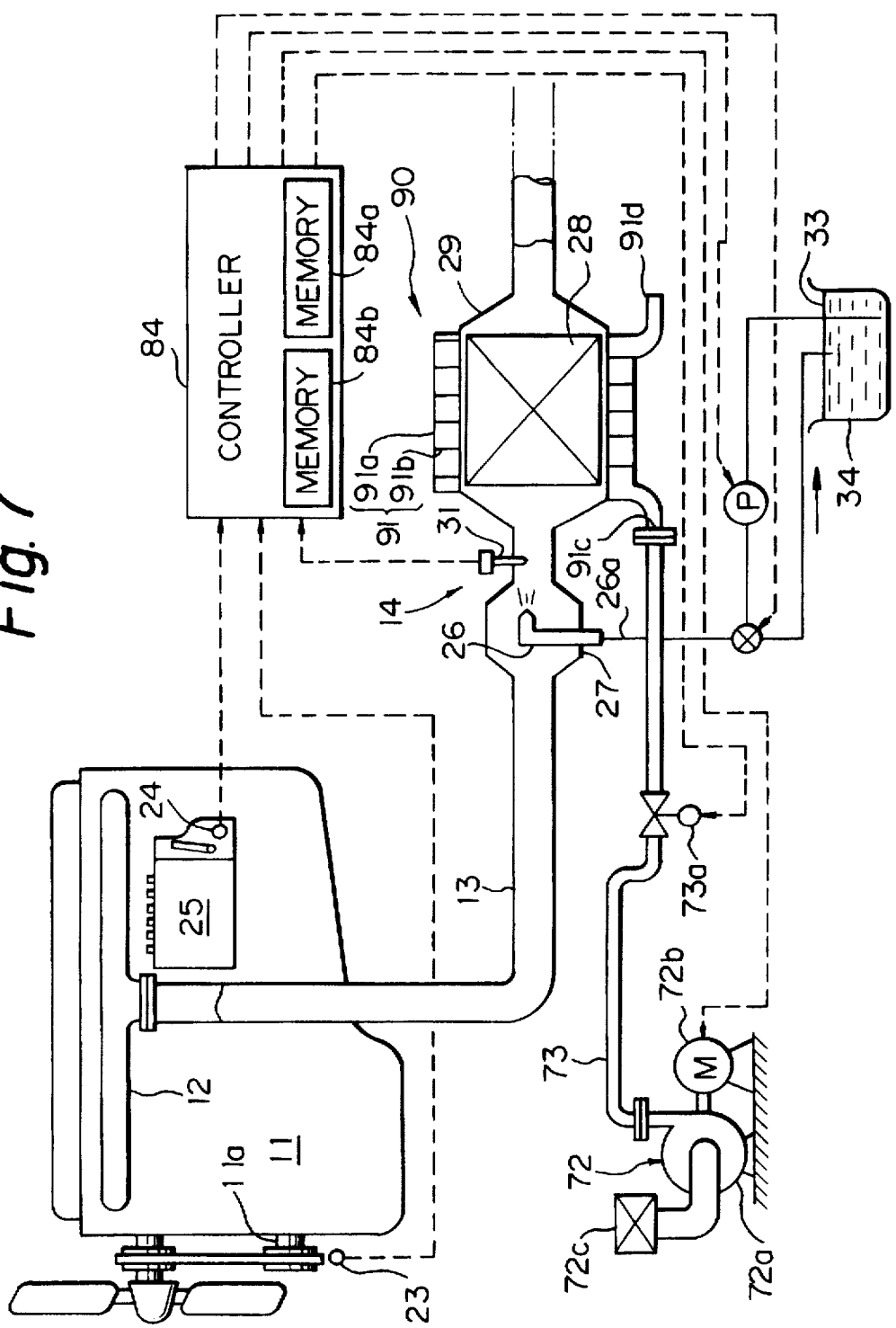
FIG. 7 is a schematic representation of a diesel-engine exhaust gas purifier according to a seventh embodiment of the invention.

FIG. 7 shows the seventh embodiment of the invention, in which the parts or components that are the same as those shown in FIGS. 1 and 4-6 are identified by like numerals.

In the case shown, the catalyzer 14 described in connection with the first embodiment is provided halfway the path of the exhaust pipe 13 from the diesel engine 11, and the cooler 90 in the form of the heat exchanger 91 described in connection with the sixth embodiment is provided around the NOx catalyst compartment 29 that is part of the catalyzer 14 and which accommodates the NOx catalyst 28. In the case under consideration, air flows as a coolant through the heat exchanger 91 as it is supplied from the blower 72 (a coolant supply member as described in connection with the fourth embodiment) via the air pipe 73. The blower 72 is controlled by the controller 84 described in connection with the fifth embodiment.

The thus constructed exhaust gas purifier operates as follows. If the temperature sensor 31 detects an exhaust gas temperature higher than 500° C., the controller 84 compares the detection outputs of the respective sensors 31, 23 and 24 with the values stored in a map format in the memory 84a, thereby determining an optimal rotating speed of the blades in the main body 72a of the blower 72, opening the air pipe open/close valve 73a and causing the blades in the main body 72a to rotate at the determined optimal speed, whereupon a specified volume of air is introduced into the tubular portion 91a of the heat exchanger 91. The thus introduced air is caused to flow spirally by means of the guide plates 91b in the heat exchanger 91 such as to cool the outer circumference of the NOx catalyst compartment 29. As a result, the NOx catalyst 28 is cooled such that the exhaust gas hotter than 500° C. gets cooler upon contact with the catalyst.

In the second, fourth and sixth embodiment, the $Al_2O_3$ support carrying Pt or Pd is used as the oxidation catalysts comprising a ceramic support carrying a noble metal but this is not the sole case of the invention and it may be replaced by any other oxidation catalyst such as $TiO_2$, $ZrO_2$ or $SiO_2$ that carry Rh, Ir or Ru.

It should also be noted that in the first embodiment, the exhaust pipe is divided into an upstream portion and a downstream portion, with an air feed pipe being connected to the underside of an end of the lower exhaust pipe. Alternatively, the exhaust pipe may be formed as a single pipe which has an air feed pipe being inserted halfway its path to face the catalyst converter.

In the fourth to seventh embodiments, air is used as the coolant which is supplied from the blower but this is not the sole case of the invention and the coolant may be cooling water for use in the engine cooling radiator.

As described on the foregoing pages, the diesel-engine exhaust gas purifier of the invention is such that a catalyzer is provided on the exhaust pipe from a diesel engine and that a cooler is provided around either a portion of the exhaust pipe between the catalyzer or the diesel engine or the catalyzer itself. The purifier is adapted to cool the exhaust gas from the diesel engine when its temperature has exceeded a threshold which is the upper limit for the effective operation of the catalyzer. The purifier has the advantage that irrespective of the operating state of the engine, it can control the atmospheric emission of particulates with reduced generation of sulfate mists if the catalyzer uses an oxidation catalyst whereas it is capable of more efficient reduction of NOx than the existing apparatus if the catalyzer uses a NOx catalyst.

What is claimed is:

1. An apparatus for purifying exhaust gas from a diesel engine, comprising:

a catalyzer coupled to an exhaust pipe extending from the diesel engine;

a cooler positioned adjacent to the catalyzer for transferring heat from the exhaust gas to a coolant supplied by the cooler, thereby reducing the temperature of the exhaust gas flowing through the catalyzer;

a temperature sensor coupled to the exhaust pipe for detecting the temperature of the exhaust gas;

a tachometer for detecting the rotating speed of the diesel engine;

a load sensor for detecting the load on the diesel engine; and a controller for controlling a rate at which the coolant is supplied by the cooler in response to the signals received from the temperature sensor, the tachometer and the load sensor.

2. An apparatus according to claim 1, wherein the catalyzer comprises a catalyst converter accommodating an oxidation catalyst.

3. An apparatus according to claim 1, wherein the catalyzer comprises:

a NOx catalyst;

an injection nozzle provided at the inlet of said NOx catalyst for ejecting a liquid hydrocarbon onto said NOx catalyst;

a liquid hydrocarbon supply member for feeding said liquid hydrocarbon to said injection nozzle via a regulating valve; and a controller for controlling said regulating valve on the basis of the respective detection outputs from the temperature sensor, the tachometer and the load sensor.

4. An apparatus as defined by claim 1, wherein the cooler comprises:

an air feed pipe positioned between the exhaust pipe and the catalyzer, upstream of the catalyzer, for introducing air into said exhaust pipe to cool the exhaust gas flowing into the catalyzer;

said temperature sensor being located at a junction defined by the air feed pipe and the catalyzer;

a valve coupled to the air feed pipe for movement between a closed and an open position in response to commands issued from the controller.

5. An apparatus according to claim 4, which further includes a turbocharger that is driven by the energy of the exhaust gas from the diesel engine, with a branch pipe being connected to an air intake pipe extending downstream of the compressor in said turbocharger, and with the air feed pipe being connected to said branch pipe.

6. An apparatus as defined by claim 1, wherein the cooler comprises:

a heat exchanger coupled to the exhaust pipe upstream of the catalyzer; and means for supplying coolant to said heat exchanger for lowering the temperature of the exhaust gas in response to commands issued by the controller.

7. An apparatus as defined by claim 6 wherein the coolant is air and the coolant supply means is a blower for regulating the flow of air supplied to the heat exchanger in response to commands issued from the controller.

8. An apparatus as defined by claim 1 wherein the catalyzer includes an outer peripheral surface and the cooler comprises:

a heat exchanger coupled to the catalyzer and in communication with the outer peripheral surface; said apparatus further comprising a coolant supply means coupled to the heat exchanger for circulating coolant through the heat exchanger in response to commands issued from the controller, thereby removing heat from the catalyzer and lowering the temperature of the exhaust gas flowing through the catalyzer.

9. An apparatus as defined by claim 8 wherein the coolant is air and the coolant supply means is a blower for regulating the flow of air supplied to the heat exchanger in response to commands issued from the controller.

* * * * *